United States Patent
Ngo (10) Patent No.: US 8,937,928 B2
(45) Date of Patent: Jan. 20, 2015

(54) FREQUENCY HOPPING IN 5GHZ WLAN VIA DYNAMIC FREQUENCY SELECTION

(75) Inventor: Chiu Y. Ngo, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 3451 days.

(21) Appl. No.: 10/227,201

(22) Filed: Aug. 23, 2002

(65) Prior Publication Data

US 2004/0037247 A1    Feb. 26, 2004

(51) Int. Cl.
 H04W 4/00    (2009.01)
 H04W 72/08   (2009.01)
 H04W 84/18   (2009.01)

(52) U.S. Cl.
 CPC .............. H04W 72/08 (2013.01); H04W 84/18 (2013.01)
 USPC ......................................... 370/332

(58) Field of Classification Search
 None
 See application file for complete search history.

(56) References Cited

U.S. PATENT DOCUMENTS

| | | | |
|---|---|---|---|
| 5,386,435 A | 1/1995 | Cooper et al. ............ | H04L 9/00 |
| 5,548,818 A * | 8/1996 | Sawyer et al. ................ | 455/515 |
| 5,696,903 A | 12/1997 | Mahany .................. | G06F 17/00 |
| 5,809,427 A | 9/1998 | Perreault et al. ......... | H04B 7/00 |
| 5,825,811 A | 10/1998 | Souissi .................. | H04B 1/713 |
| 5,912,918 A | 6/1999 | Bauchot et al. ........ | H04B 15/00 |
| 5,940,746 A * | 8/1999 | Otting et al. ............... | 455/161.3 |
| 6,738,599 B2 * | 5/2004 | Black et al. ..................... | 455/62 |
| 7,006,821 B2 * | 2/2006 | Tee .............................. | 455/421 |
| 2002/0072382 A1 * | 6/2002 | Fong et al. .................... | 455/507 |
| 2002/0097696 A1 * | 7/2002 | Kossi et al. ................... | 370/330 |
| 2003/0035388 A1 * | 2/2003 | Schmidt ....................... | 370/329 |
| 2003/0054829 A1 * | 3/2003 | Moisio .......................... | 455/452 |
| 2006/0176850 A1 * | 8/2006 | Gan et al. ..................... | 370/329 |

OTHER PUBLICATIONS

US Patent Application Publication, Publication No. US/2001/0022805 A1; Pubication Date: Sep. 20, 2001; Wireless Device and Method.

* cited by examiner

Primary Examiner — Rhonda Murphy
(74) Attorney, Agent, or Firm — Larry Liberchuk (57) ABSTRACT

Disclosed is a method and system for dynamically selecting a communication channel between an access point (AP) and a plurality of mobile terminals (MTs) in a wireless local area network (WLAN), the method having the steps of (a) measuring a channel quality of a plurality of frequency channels, (b) reporting to the AP from the plurality of MTs of the candidate channels including a received signal strength indication (RSSI) of all channels measured and, (c) selecting one of the channels based on the channel quality report for use in communication between the AP and the plurality of MTs.

16 Claims, 5 Drawing Sheets

FREQUENCY HOPPING IN 5GHZ WLAN VIA DYNAMIC FREQUENCY SELECTION

BACKGROUND OF THE INVENTION

1. Field of the Invention

The present invention relates to a method and apparatus for providing diversity in frequency utilization in a wireless local area network (WLAN) using dynamic frequency selection (DFS) to allow frequency hopping among a subset of available frequency channels.

2. Description of Related Art

The European Telecommunications Standards Institute (ETSI) standard for wireless local area networks (WLAN), from the Broadband Radio Access Networks (BRAN) project, is contained in the HIgh PErformance Radio Local Area Network Type 2 (HIPERLAN2) specification and available at the institute's world-wide-web site In general, there are two variants of WLANs: the infrastructure-based type and the ad-hoc type. In the former type of network, communication typically takes place only between the wireless nodes, called mobile terminals (MT) or stations, and an access point (AP). An AP is a device that is responsible for the centralized control of the resources in a radio cell and is generally connected to a fixed (i.e., not wireless) network. In the ad-hoc type of network, communication takes place between the wireless nodes, with one of the MTs, referred to as a Central Controller (CC), providing control functionality equivalent to that of an AP. The MTs and the AP, which are within the same radio coverage area, are referred to together as a cell.

The HIPERLAN2 standard includes a radio resource management feature called "Dynamic Frequency Selection (DFS)," which allows equal usage of available frequencies with the intended effect of avoiding the interference of other devices using the same spectrum. The interference may arise from neighboring HIPERLAN2 networks using the same frequency or non-HIPERLAN2 devices in the frequency band. For example, when two adjacent CELLs are located close to each other and operate at the same channel, which are referred to as overlapping cells, it is difficult to support the required quality-of-service (QoS) due to the possible mutual interference between the overlapping cells.

In addition, other co-located systems (for example, wireless device as set forth in the International Standard ISO/IEC 8802-11. "Information Technology—Telecommunications and information exchange area networks," 1999 Edition) near a particular MT, may cause reception interference. It is not always possible to avoid interference by either eliminating non-WLAN devices or even carefully planning channel allocations to cells before the WLAN deployment, especially where other WLAN and non-WLAN devices are operating independently in the vicinity, for example, in the neighboring houses or offices.

Currently, one solution to avoid interference is to have every AP/CC constantly collects measurement results and, when interference is detected, chooses an operating frequency based on the measured results, with the decision being done independently of other APs/CCs. However, there is often a delay between the detection of the interference and the switching of the AP/CC and the Mobile Terminals (MTs) to the new frequency. Thus, QoS is not consistently maintained as the system is only reactive to problems and it takes time for all the devices in the cell to switch over.

Thus it is desirable to provide a proactive system of DFS to provide a broad level of frequency diversity that can improve the quality of communication in the WLAN that supplements the current reactive system of DFS.

SUMMARY OF THE INVENTION

The present invention is directed to a dynamic frequency selection method and system in a wireless local area network (WLAN), wherein the access point (AP)/central controller (CC) can proactively and dynamically select channels from a set of known good channels according to the criteria determined by the AP/CC.

According to an aspect of the present invention, there is provided a method for dynamically selecting a communication channel between an access point (AP) and at least one mobile terminal (MT) located within the coverage area of a cell in a wireless local area network (WLAN). The method includes the steps of: measuring a channel quality of a plurality of frequency channels including a received signal strength indicator (RSSI) for each channel measured; updating a list of best available frequency channels based on the RSSI of each channel; and, selecting one of the channels from the list of best available frequency channels for use in communication between the AP and the plurality of MTs.

According to another aspect of the present invention, there is provided an apparatus for dynamically selecting a communication channel between an access point (AP) and at least one mobile terminal (MT) located within the coverage area of a cell in a wireless local area network (WLAN). The apparatus includes means for measuring a channel quality of a plurality of frequency channels, including a received signal strength indicator (RSSI) for each channel measured; means for updating a list of best available frequency channels based on the RSSI of each channel; and, means for selecting one of the channels from the list of best available frequency channels for use in communication between the AP and the plurality of MTs.

According to yet another aspect of the invention, there is provided an apparatus for dynamically selecting a communication channel between an access point (AP) and at least one mobile terminal (MT) located within the coverage area of a cell in a wireless local area network (WLAN). The apparatus having a memory for storing a computer-readable code; and, a processor operatively coupled to the memory, the computer-readable code configured to allow the processor to measure a channel quality of a plurality of frequency channels, including a received signal strength indicator (RSSI) for each channel measured; update a list of best available frequency channels based on the RSSI of each channel; and, select one of the channels from the list of best available frequency channels for use in communication between the AP and the plurality of MTs.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. In addition, it should be noted that although this invention uses HIPERLAN2 as an example for illustration, the invention itself can be applied to IEEE 802.11a using the forth-coming supplement IEEE 802.11h as well.

Figure 1:
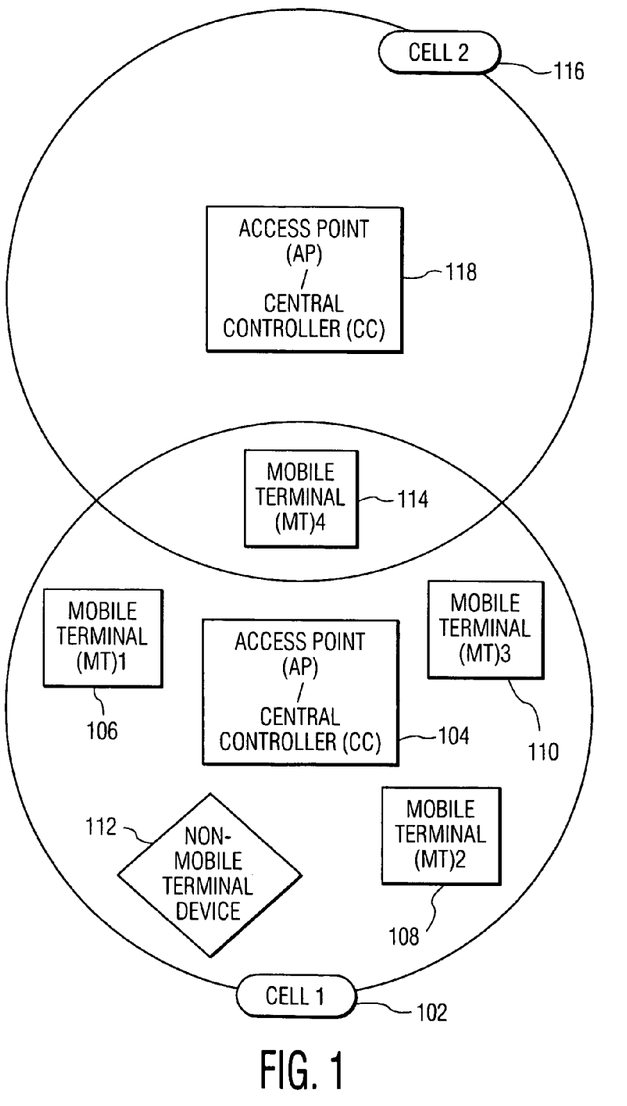
FIG. 1 is a simplified block diagram illustrating the architecture of a wireless communication system whereto embodiments of the present invention are to be applied.

FIG. 1 illustrates a representative network whereto embodiments of the present invention are to be applied. As shown in FIG. 1, a cell 102 contains an access point/central controller (AP/CC) 104 coupled to a plurality of mobile terminals, MT 1 106, MT 2 108, MT 3 110 and MT4 114. The MTs and AP/CC communicating with each other through a wireless link having a plurality of wireless channels. Also in FIG. 1, MT 4 114 of cell 1 102 is in an overlapping region with a neighboring cell 2 116, thus experiencing interference from other MTs/AP in the neighboring cell 2 116. In addition, FIG. 1 also contains a non-MT device 112. Although non-MT device 112 is not a part of the cell 1 102, it operates on the same frequencies of the AP/CC and MTs in the cell and causes interference for the devices in the cell. This creates a noisy environment and potentially has the ability to disrupt communications in the network. It should be noted that the network shown in FIG. 1 is small for purposes of illustration. In practice most networks would include a much larger number of mobile stations and non-NIT devices.

Dynamic frequency selection (DFS) is a feature provided in the HIPERLAN2 specification that allows equal sharing of available frequencies among different systems. Specifically, the DFS mechanism enables AP/CC 104 to select a channel based on channel quality reports from all MTs associated with cell 1 102, which also reduces the interference to other co-located systems. Currently, DFS is a "reactive" measure to the vulnerable wireless environment, i.e. DFS provides a mechanism for switching to a different frequency channel only when the current channel is too "noisy." The present invention provides a "proactive" measure by periodically switching among a subset of available frequency channels. By doing so, excessive delay may be avoided before the complete WLAN system is allowed to switch to another channel while suffering from interference. At the same time, a broad level of frequency diversity can be provided to the WLAN system. The subset of available frequency channels is established based on the measurement of Received Signal Strength (RSS) in the MTs of the WLAN that is reported to the AP/CC.

Figure 2:
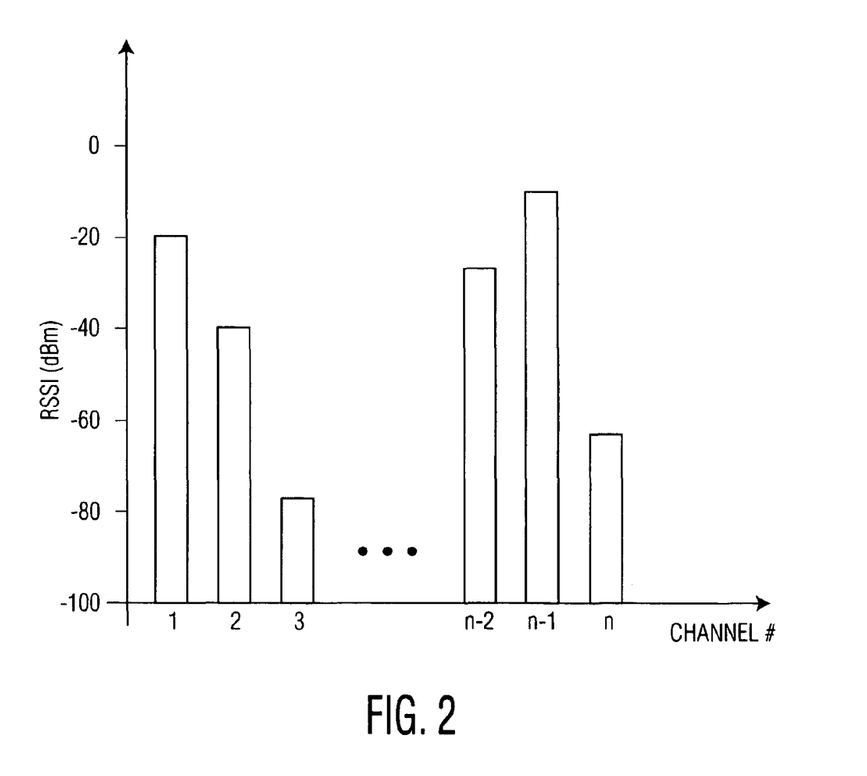
FIG. 2 illustrates a sample received signal strength scan of available channels in the system of FIG. 1 according to an embodiment of the present invention.

FIG. 2 illustrates a sample RSS scan of available channels in cell 1 102. There are three different types of RSS1 values in HIPERLAN2: RSS0, RSS1, and RSS2. In the following discussions, RSS0 will be used as an exemplary measurement. RSS0 is a measurement of the actual received and sensed signal strength in an MT and ranges from >−20 to −91 dBm. RSS1 is another measurement of RSS and is based on a reference RSS. The third type of received signal strength value, RSS2, is produced by MTs that support direct mode operations.

As shown in FIG. 2, measurements of RSS from channels 1 to n are collected by AP/CC 104. From this set of measurements. AP/CC 104 can determine the strongest RSS for all the channels in cell 1 102. AP/CC 104 can then form a subset of the channels with the strongest signals and switch among those channels in the subset according to a predetermined schedule.

Figure 3:
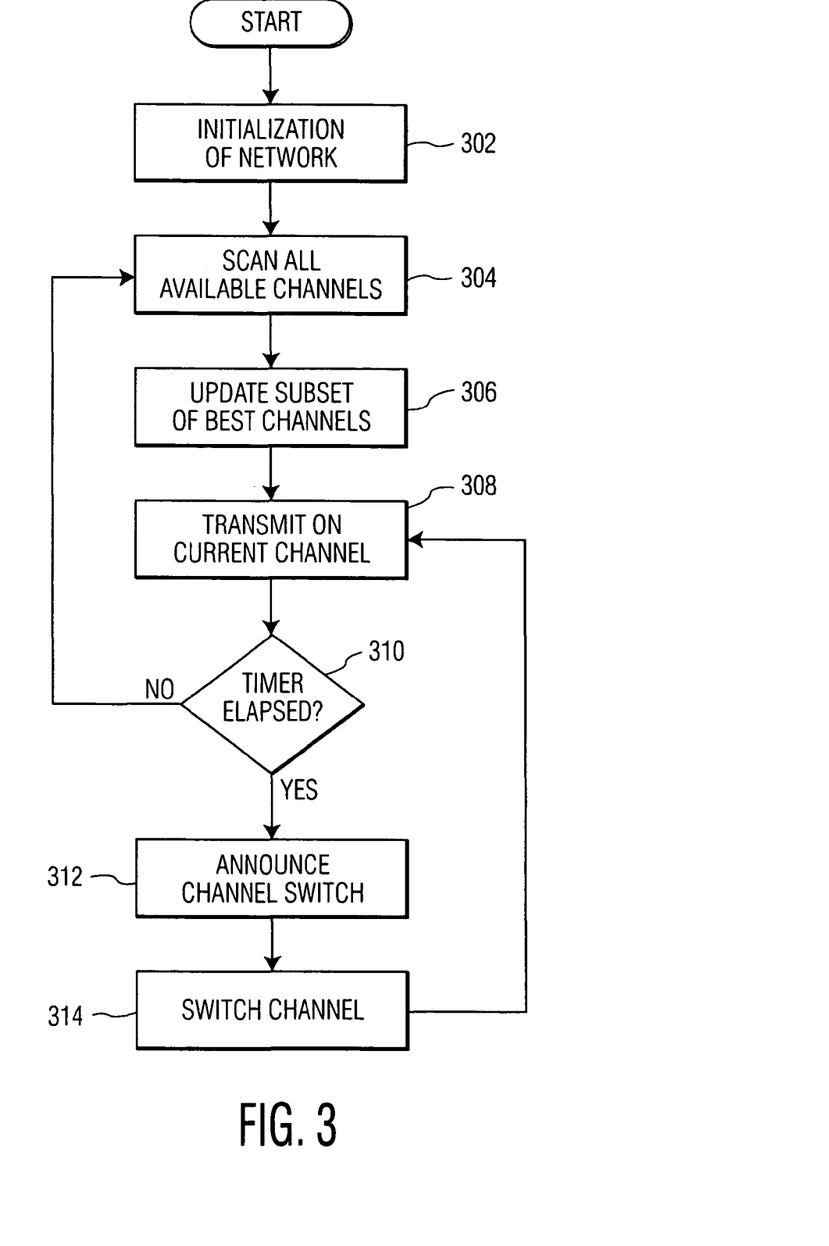
FIG. 3 is a flow chart illustrating the operation steps of providing diversity in frequency utilization of the wireless communication system of FIG. 1 according to an embodiment of the present invention.

FIG. 3 is a flow chart illustrating the operation steps of providing diversity in frequency utilization according to an embodiment of the present invention. The method of operation includes the following steps: in step 302, the network is initialized. The initialization process is implementation specific and is well-known in the art. After the network is initialized, AP/CC 104 collects a measurement of the RSS for all channels in the system in step 304. In one embodiment of the present invention, AP/CC 104 monitors all available channels continuously by measuring the channels using an AP-absence message or requesting MTs to measure the channels. In another embodiment, AP/CC 104 monitors all available channels continuously by using a second set of radio systems in AP/CC 104. By using a second set of radio systems, AP/CC 104 can avoid the interruption of user data transmission. A sample scan of the RSS of the channels of the system is as shown in FIG. 2.

In step 306, AP/CC 104 updates a list of "best" available channels. In one embodiment, the list, or subset, of best available channels contains the channels that have a RSSI value that is greater than −45 dBm. Also, there should be at least one channel in the list of best available channels. If no channels can be found that has a sufficient RSSI value, then AP/CC 104 will continue to monitor all channels until one can be found. It should be noted that the size of the subset of best available channels (i.e., the number of hopping channels) should not be too large. Otherwise, this single WLAN system will occupy the complete spectrum and other systems will not be able to use it. In one embodiment, the target size of the subset of best available channels is 5 channels.

In addition, AP/CC 104 determines the order of the channels in the list where AP/CC 104 will hop from one channel to the next down the list as described herein. In one embodiment, AP/CC 104 will order the list in a sequential fashion based on the quality of the signal strength for each channel. Specifically, AP/CC 104 will order channels from the highest RSSI to the lowest so that AP/CC 104 will be able to transmit on the channels with the highest RSSI first. In another embodiment, the list will be ordered randomly. In yet another embodiment, the list will be ordered with another algorithm, based on other factors such as whether other cells or other non-HIPERLAN2 devices interfere with the channels on the list. The list may be dynamically changed in size and order to provide the best subset of channels. An exemplary list is shown in the Table below.

TABLE

Sample Best Available Channels List

| Channel | RSSI [dBm] | Time-to-Live [Mac Frames] |
| --- | --- | --- |
| 5 | −20 | 5000 |
| 3 | −32 | 3400 |
| 11 | −36 | 3000 |

Given the overhead associated with channel switching the switching should be done in the order of seconds. In addition, the time-to-live (TTL) value may be proportional to the RSSI value for the channel, where a higher RSSI values would mean a larger TTL value.

In step 308, AP/CC 104 will begin to transmit on the current channel. If the system has just been initialized, the current channel is the first channel in the list of best available channels. Otherwise, the current channel is the channel last determined to be the channel on which AP/CC 104 is to transmit. During this phase, AP/CC 104 and the MTs in cell 1 102 are able to operate in accordance to the HIPERLAN2 standards. However, if there is degradation in the current channel, AP/CC 104 may change channels to the next channel in the list of best available channels. Specifically, operation would jump to step 312, where a channel change would be initiated by AP/CC 104."

During the operation of AP/CC 104, a timer or counter value is set such that in step 310, it is determined whether a particular time period, or Time-To-Live (TTL) value, has been reached. In one embodiment, this time period is determined to equal a period of time for a set number of MAC frames to be transmitted, where a MAC frame in HIPER-LAN2 is 2 ms. In another embodiment, this time period is based on the RSSI value for the current channel, where a better RSSI value would equate to a longer time period. Depending on the implementation, there may be a limit to the maximum time period that may be used for each channel such that no channel is used indefinitely. Assuming the time period has not elapsed, operation returns to step 304. If the time period has elapsed, the operation continues with step 312.

In step 312, AP/CC 104 provides an advanced announcement to all associated MTs in cell 102 that it is about to change to another channel. As discussed above, the channel to which AP/CC 104 is going to be changed is the next channel in the list of best available channels. In another embodiment, the next channel could be a randomly selected channel.

In step 314, AP/CC 104 and all MTs switch to the new channel—this becomes the current channel. This movement into a new channel is performed by changing the carrier frequency of the OFDM PHY. Operation then continues with step 308, where all devices in cell 1 102 operate on the new channel.

In the embodiment described above, AP/CC 104 is constantly monitoring and updating the list of best available channels. This provides a proactive mechanism for AP/CC 104 to respond to any interference in the system. However, as discussed to achieve constant monitoring AP/CC 104 either has to include a second radio system or take resources way from cell 1 102. The former adds costs to AP/CC 104, and the latter requires the use of resources which could be used to transmit "normal" network data, reducing throughput.

Figure 4:
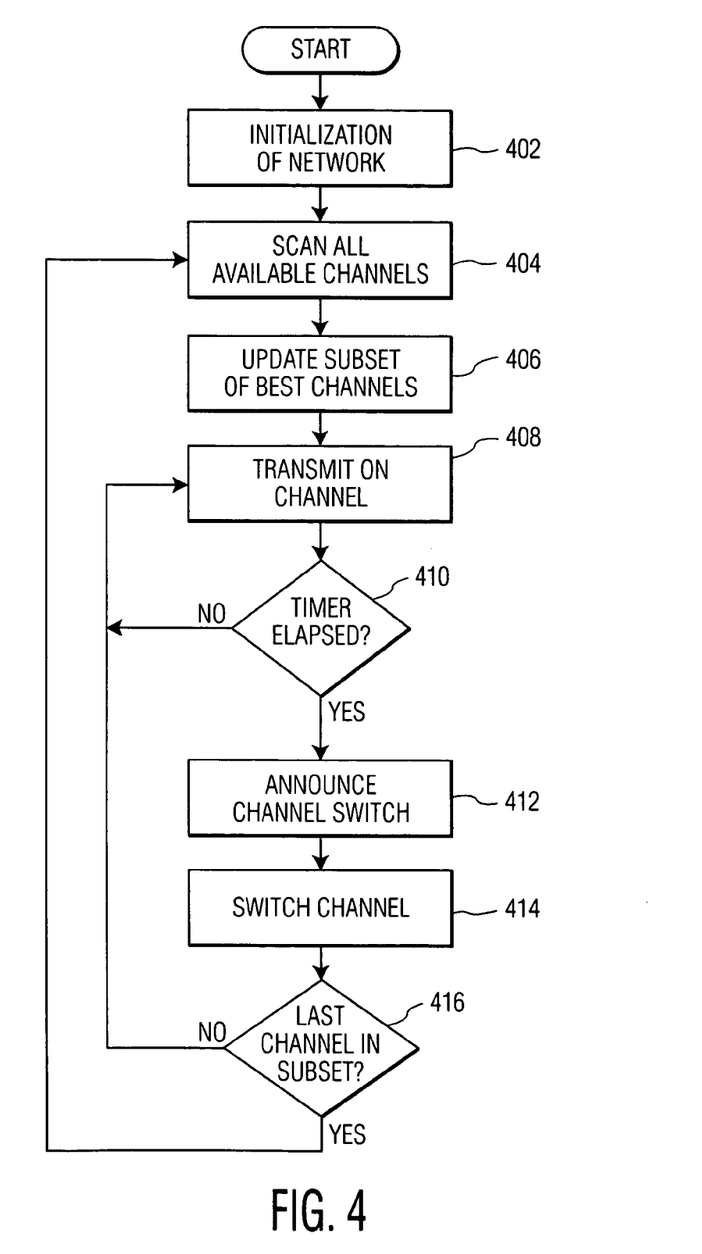
FIG. 4 is a flow chart illustrating the operation steps of providing diversity in frequency utilization of the wireless communication system of FIG. 1 according to another embodiment of the present invention; and, FIG. 5 illustrates a simplified block diagram of an access point or central controller configured in accordance with an embodiment of the present invention.

FIG. 4 is a flow chart illustrating the operation steps of providing diversity in frequency utilization according to another embodiment of the present invention. In this embodiment, as opposed to the embodiment described in FIG. 3, the list of best available channels is not updated until AP/CC 104 is transmitting on the last channel in the list.

The method of operation includes the following steps: in step 402, the network is initialized. The initialization process is implementation specific and is well-known in the art. After the network is initialized. AP/CC 104 collects a measurement of the RSS for all channels in the system in step 404. In one embodiment of the present invention, AP/CC 104 measures the channels using an AP-absence message. In another embodiment, AP/CC 104 measures all available channels by using a second set of radio systems in AP/CC 104. By using a second set of radio systems, AP/CC 104 can avoid the interruption of user data transmission. A sample scan of the RSS of the channels of the system is as shown in FIG. 2.

In step 406, AP/CC 104 updates a list of "best" available channels. In one embodiment, the list, or subset, of best available channels contains the channels that have a RSSI value that is greater than −45 dBm. Also, there should be at least one channel in the list of best available channels. If no channels can be found that has a sufficient RSSI value, then AP/CC 104 will continue to monitor all channels until one can be found. It should be noted that the size of subset of best available channels (i.e., the number of hopping channels) should not be too large. Otherwise, this single WLAN system will occupy the complete spectrum and other systems will not be able to use it. In one embodiment, the target size of the subset of best available channels is 5 channels.

In addition. AP/CC 104 determines the order of the channels in the list where AP/CC 104 will hop from one channel to the next down the list as described herein. In one embodiment, AP/CC 104 will order the list in a sequential fashion based on the quality of the signal strength for each channel. Specifically, AP/CC 104 will order channels from the highest RSSI to the lowest so that AP/CC 104 will be able to transmit on the channels with the highest RSSI first. In another embodiment, the list will be ordered randomly. In yet another embodiment, the list will be order with another algorithm, based on other factors such as whether other cells or other non-HIPERLAN2 devices interfere with the channels on the list. The list may be dynamically changed in size and order to provide the best subset of channels. An exemplary list is shown in the Table below.

TABLE

Sample Best Available Channels List

| Channel | RSSI [dBm] | Time-to-Live [Mac Frames] |
|---|---|---|
| 3 | −35 | 3000 |
| 2 | −20 | 5000 |
| 11 | −44 | 2000 |

Given the overhead associated with channel switching, the switching should be done in the order of seconds. In addition, the time-to-live (TTL) value may be proportional to the RSSI value for the channel, where a higher RSSI values would mean a larger TTL value.

In step 408, AP/CC 104 will begin to transmit on the current channel. If the system has just been initialized the current channel is the first channel in the list of best available channels. Otherwise, the current channel is the channel last determined to be the channel on which AP/CC 104 is to transmit. During this phase, AP/CC 104 and the MTs in cell 1 102 are able to operate in accordance to the HIPERLAN2 standards. However, if there is degradation in the current channel, AP/CC 104 may change channels to the next channel in the list of best available channels. Specifically, operation would jump to step 412, where a channel change would be initiated by AP/CC 104.

During the operation of AP/CC 104, a timer or counter value is set such that in step 410, it is determined whether a particular time period, or Time-To-Live (TTL) value, has been reached. In one embodiment, this time period is determined to equal a period of time for a set number of MAC frames to be transmitted, where a MAC frame in HIPER-LAN2 is 2 ms. In another embodiment, this time period is based on the RSSI value for the current channel, where a better RSSI value would equate to a longer time period. Depending on the implementation, there may be a limit to the maximum time period that may be used for each channel such that no channel is used indefinitely. Assuming the time period has not elapsed, operation returns to step 404. If the time period has elapsed, the operation continues with step 412.

In step 412, AP/CC 104 provides an advanced announcement to all associated MTs in cell 1 102 that it is about to change to another channel. As discussed above, the channel to which AP/CC 104 is going to be changed is the next channel in the list of best available channels. In another embodiment, the next channel could be a randomly selected channel.

In step 414, AP/CC 104 and all MTs switch to the new channel, this becomes the current channel. This movement into a new channel is performed by changing the carrier frequency of the OFDM PHY. After the system changes channels, operation continues with step 416, where AP/CC 104 checks to see if the channel to which the system is being switched is the last channel in the list of best available channels. If so, then operation continues with step 404, where a new set of channels will be added to the list. If the channel to which the system is switching is not the last channel in the list, then operation returns to step 408, where all devices in cell 1 102 operate on the new channel.

Figure 5:
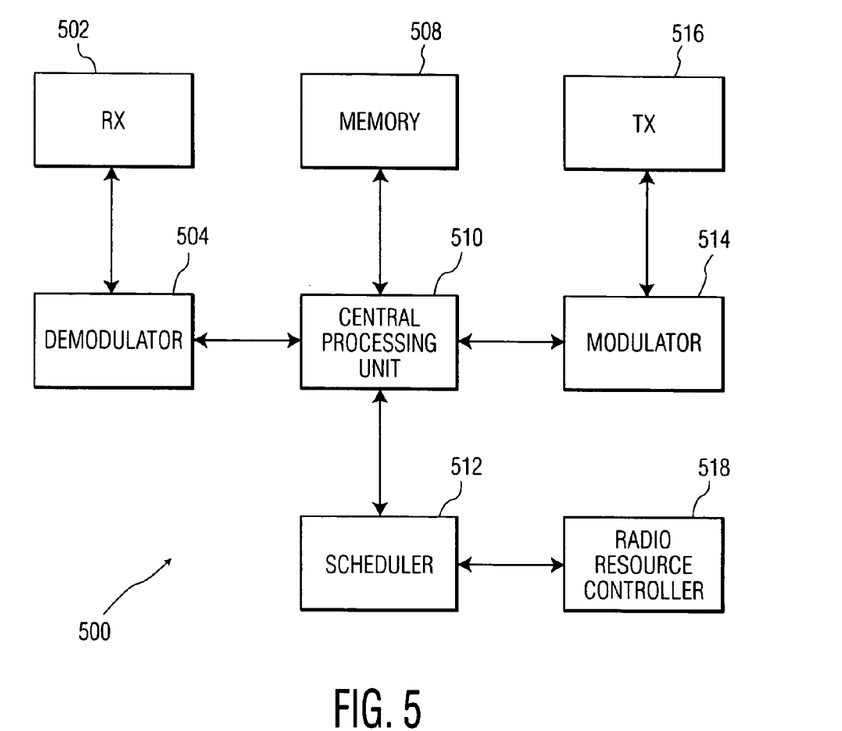

Referring to FIG. 5, AP/CC 104 may be configured as a system 500 with the architecture that is illustrated in the block diagram of FIG. 5. System 500 includes a receiver 502, a demodulator 504, a memory 508, a control processing unit (processor) 510, a scheduler 512, a modulator 514, a transmitter 516 and a radio resource controller 518. The exemplary system 500 of FIG. 5 is for descriptive purposes only. Although the description may refer to terms commonly used in describing particular access points or mobile stations, the description and concepts equally apply to other processing systems, including systems having architectures dissimilar to that shown in FIG. 5. In addition, various elements of the described architecture of system 500 may be applied to the architecture of each MT within cell 102 of FIG. 1, although such elements as the scheduler 512 are typically only located in such devices as AP/CC 104.

In operation, the receiver 502 and the transmitter 516 are coupled to an antenna (not shown) to convert received signals and transmit desired data into corresponding digital data via the demodulator 504 and the modulator 514, respectively. The scheduler 512 operates under the control of the processor 510 to determine the composition of MAC frames in accordance with the HIPERLAN2 standard using the novel aspects of the present invention. In addition, the inputs to scheduler 512 may include information from radio resource controller 518, which performs such radio resource management functions as link adaptation, power control, admission control, congestion control, dynamic frequency selection, and handover initiation. It is to be noted that one or more of the described functions of the scheduler 512 may be achieved by using program code stored in memory 508 and executed by processor 510. Memory 508 is coupled to the processor 510 and contains all program code and data necessary for operation of the system 500. For example, memory 508 is used to store the table or list of best available channels and list of RSSI values for all channels. In addition, memory 508 is used to store the current value of the TTL counter.

As is apparent from the foregoing, the present invention has an advantage in that an improved dynamic frequency selection (DFS) mechanism can be obtained with some modification in the current HIPERLAN2 specification. It should be noted that although the present disclosure is confined to infrastructure-based HIPERLAN2 WLANs with an AP/CC as a centralized decision-maker of the DFS within a cell, the present invention can be easily extended to support the ad-hoc mode of WLAN systems. In addition, the present invention may be applicable to other WLAN systems as well, such as the IEEE 802.11 WLAN system.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular disclosed embodiment as the best mode contemplated for carrying out the present invention, but that the present invention include all embodiments falling within the scope of the appended claims.

What is claimed is:

1. A method for dynamically selecting a communication channel between an access point (AP) and at least one mobile terminal (MT) located within the coverage area of a cell in a wireless local area network (WLAN), the method comprising:
    measuring a channel quality of a plurality of frequency channels, including a received signal strength indicator (RSSI) for each channel measured;
    updating a list of best available frequency channels based on the RSSI of each channel;
    upon expiration of a timer, selecting one of the channels from the list of best available frequency channels, other than a currently used channel, for use in communication between the AP and the at least one mobile terminal; and
    switching to the selected channel.

2. The method of claim 1, where the list of best available frequency channels is sorted based on the RSSI of each channel, and the selection of one of the channels is sequential through the list.

3. The method of claim 1, where the selection of one of the channels in the list of best available frequency channels is based on the RSSI of each channel.

4. The method of claim 1, where updating a list of best available frequency channels based on the RSSI of each channel comprising:
    determining the RSSI of a channel; and,
    comparing the RSSI of the channel with a threshold value.

5. The method of claim 4, where the threshold value is between a range of −45 dBm to 0 dBm.

6. The method of claim 1, further comprising the step of updating a list of best available frequency channels based on the RSSI of each channel if a timer has not expired.

7. The method of claim 1, where determining if a timer has expired comprises the step of determining if a counter has reached a timer threshold.

8. The method of claim 7, further comprising:
    announcing a channel switch event to the other channel from the list of best available frequency channels.

9. An apparatus for dynamically selecting a communication channel between an access point (AP) and at least one mobile terminal (MT) located within the coverage area of a cell in a wireless local area network (WLAN), comprising:
    means for measuring a channel quality of a plurality of frequency channels, including a received signal strength indicator (RSSI) for each channel measured;
    means for updating a list of best available frequency channels based on the RSSI of each channel;
    means for determining if a timer has expired; and means for, upon detecting expiration of the timer, selecting one of the channels from the list of best available frequency channels, other than a currently used channel, for use in communication between the AP and the at least one mobile terminal and for switching to the selected channel.

10. The apparatus of claim 9, where the list of best available frequency channels is sorted based on the RSSI of each channel, and the selection of one of the channels is sequential through the list.

11. The apparatus of claim 9, where the selection of one of the channels in the list of best available frequency channels is based on the RSSI of each channel.

12. The apparatus of claim 9, where means for updating the list of best available frequency channels based on the RSSI of each channel comprises:
 means for determining the RSSI of a channel; and,
 means for comparing the RSSI of the channel with a threshold value.

13. The apparatus of claim 12, where the threshold value is between a range of −45 dBm to 0 dBm.

14. The apparatus of claim 9, further comprising means for updating a list of best available frequency channels based on the RSSI of each channel at a known rate.

15. The apparatus of claim 9, where means for determination of expiration of said time comprises means for determining if a counter has reached a timer threshold.

16. The apparatus of claim 9, further comprising:
 means for announcing a channel switch event to the other channel from the list of best available frequency channels.

* * * * *